(12) United States Patent
Takahashi

(10) Patent No.: US 8,259,281 B2
(45) Date of Patent: Sep. 4, 2012

(54) LCD BACKLIGHT UNIT HAVING A HEAT SINK AND A HEAT RECEIVING MEMBER

(75) Inventor: Kei Takahashi, Kawasaki Kanagawa (JP)

(73) Assignee: NLT Technologies, Ltd. (JP)

(*) Notice: Subject to any disclaimer, the term of this patent is extended or adjusted under 35 U.S.C. 154(b) by 767 days.

(21) Appl. No.: 11/737,635

(22) Filed: Apr. 19, 2007

(65) Prior Publication Data

US 2007/0247564 A1    Oct. 25, 2007

(30) Foreign Application Priority Data

Apr. 19, 2006  (JP) .................. 2006-115383

(51) Int. Cl.
*G02F 1/1333* (2006.01)
*G06F 1/20* (2006.01)
(52) U.S. Cl. ............. 349/161; 349/65; 361/679.46; 361/679.47; 361/679.54; 361/688; 361/704; 361/705; 361/706; 361/707; 361/709; 361/714
(58) Field of Classification Search .......... 349/161, 349/65; 361/679.46–679.54, 688–723
See application file for complete search history.

(56) References Cited

U.S. PATENT DOCUMENTS

| | | | | |
|---|---|---|---|---|
| 5,258,649 A | * | 11/1993 | Tanaka et al. | 257/787 |
| 5,358,032 A | * | 10/1994 | Arai et al. | 165/80.3 |
| 5,872,699 A | * | 2/1999 | Nishii et al. | 361/699 |
| 7,513,661 B2 | * | 4/2009 | Hamada et al. | 362/373 |
| 2006/0062015 A1 | | 3/2006 | Chung et al. | |
| 2007/0008275 A1 | | 1/2007 | Sugitani et al. | 345/102 |

FOREIGN PATENT DOCUMENTS

| | | |
|---|---|---|
| CN | 1553468 | 12/2004 |
| CN | 1721928 | 1/2006 |
| CN | 1734326 | 2/2006 |
| JP | 2004-186004 | 7/2004 |
| JP | 2006-018175 | 1/2006 |
| WO | WO 2005114045 A1 * | 12/2005 |

OTHER PUBLICATIONS

Machine translation of JP 2006-018175.*

* cited by examiner

*Primary Examiner* — Uyen Chau N Le
*Assistant Examiner* — Michael Mooney
(74) *Attorney, Agent, or Firm* — Hayes Soloway P.C.

(57) ABSTRACT

A LCD device includes color LEDs, a light-mixing optical guide plate and a main optical guide plate for guiding lights from the color LEDs, a LCD panel for receiving lights from the main optical guide plate, a housing for supporting the LCD panel, light-mixing optical guide plate and main optical guide plate in block, and a heat sink for dissipating the heat transferred from the LEDs. On the rear surface side of the light-mixing optical guide plate, a heat receiving member is provided having a higher heat receiving capability than the rest of the housing.

6 Claims, 4 Drawing Sheets

LCD BACKLIGHT UNIT HAVING A HEAT SINK AND A HEAT RECEIVING MEMBER

This application is based upon and claims the benefit of priority from Japanese patent application No. 2006-115383 filed on Apr. 19, 2006, the disclosure of which is incorporated herein in its entirety by reference.

BACKGROUND OF THE INVENTION

1. Field of the Invention

The present invention relates to a backlight unit suitably used in a liquid crystal display (LCD) device, and more particularly to a backlight unit having an improved structure.

2. Description of the Related Art

In a LCD device, there is provided a LCD panel on the front side of the light-emitting surface of a backlight unit. The LCD panel displays an image by performing optical switching for each of pixels arranged in a matrix. There are two types of backlight units including a central-light-source type in which the light source is provided at the rear side of the light-emitting surface and the light emitted from the light source passes directly through the light-emitting surface, and an edge-light-source type in which the light source is provided at the edge of an optical guide plate provided at the rear side of the light-emitting surface and the light emitted from the light source is guided by the optical guide plate to pass through the light-emitting surface.

The edge-light-source backlight unit has the advantage that the light source can be disposed at the side edge of the optical guide plate to provide a small thickness for the backlight unit. Examples of the light source of the edge-light-source backlight unit include a linear cold-cathode fluorescent lamp and a chip-type light emitting diode (LED). In recent years, the chip-type LED is the mainstream of the light source due to smaller dimensions and longer lifetime of the light source. Patent Publication JP-2004-186004A describes an edge-light-source backlight unit using such a chip-type LED as the light source.

In the backlight unit using a LED as the light source, in order to emit the light as white light, three color LEDS emitting three colors of red, green and blue are provided without using a single white LED, because the typical white LED has an insufficient emission power. In the backlight unit described in the above patent publication, if the optical path from the color LEDs to the light-emitting surface of the backlight unit has an insufficient length, there arises a problem in that the lights of three colors emitted from the LEDs are not well mixed to reach the light-emitting surface. In this case, the backlight unit cannot provide an even-color backlight at the light-emitting surface, especially at the edge portion thereof.

In order to solve the above problem involved with the conventional backlight unit including color LEDs, Patent Publication JP-2006-18175A describes provision of an additional light-mixing optical guide plate provided on the rear side of the main optical guide plate. FIG. 4 is a sectional view showing the configuration of the LCD device described in this patent publication. The LCD device, generally designated by 100, includes a backlight unit 11, a LCD panel 12 provided on the front side of the light-emitting surface 11a of the backlight unit 11, and a shield front 13 configuring a housing and defining the outer edge of the screen of the LCD panel 12.

Color LEDs 21 are provided at the rear side of a rear cover 38 configuring the rear housing of the backlight unit 11. The color lights emitted from the color LEDs 21 are guided by a first reflector 31, a light-mixing optical guide plate 32, a second reflector 33, and a main optical guide plate 34, thereby passing through an optical sheet 36 configuring the light-emitting surface 11a of the backlight unit to reach the LCD panel 12. In this configuration of the LCD device 100, the color lights emitted from the LEDs 21 are mixed sufficiently by the light-mixing optical guide plate 32, thereby achieving an even color light at the light-emitting surface 11a of the backlight unit.

For a color LCD device, it is important to maintain the color reproducibility of the display image for a long period of service. In order to maintain the color reproducibility of the display image during the lifetime of the LCD device, the change of color tones due to aged deterioration should be suppressed on the light-emitting surface of the backlight unit. For this purpose, it is important to suppress the rise of temperature of the LED devices due to the heat generated in the LEDs. If the temperature of the color LEDs rises excessively, the color LEDs will be deteriorated, lowering the luminance of the color LEDs. The reduction in the luminance occurs in an amount depending on the characteristic of the respective LEDs, resulting in a change of the color tone of the backlight.

In the LCD device 100 described in JP-2006-18175A, in order to suppress the temperature rise of the color LEDs 21, there is provided a heat sink 23 on the rear surface of a wiring board 22 on which the LEDs 21 are mounted, thereby diffusing the heat generated in the color LEDs 21 via the heat sink 23. In order to further enhance the heat dissipation capability of the LCD device, a structure is employed to enlarge the surface area thereof by providing fins 25 on the heat sink 23, as depicted in FIG. 4.

However, for a LCD device for use in the field of photograph, printing etc., which are required of a higher color reproducibility, the temperature rise should be suppressed as much as possible, and thus the heat dissipation capability should be further improved. In this improvement, a larger surface of the heat sink 23 should be avoided because the larger surface inevitably increases the dimensions of the backlight unit 11. Therefore, it is desirable to improve the heat dissipation capability of the backlight unit without increasing the dimensions of the backlight unit 11.

SUMMARY OF THE INVENTION

In view of the above, it is an object of the present invention to provide a backlight unit which is capable of improving the heat dissipation capability of the light source without increasing the entire device size, and a LCD device having such a backlight unit.

The present invention provides, in a first aspect thereof, a liquid crystal display (LCD) device including: light source; an optical guide plate guiding, in an in-plane direction thereof, light emitted from the light source; a LCD panel disposed in front of the optical guide plate for receiving the light from the optical guide plate; and a housing for supporting at least the optical guide plate and the LCD panel in block, the housing including a rear cover and a rest of the housing; and a heat sink opposing the rear cover and diffusing heat generated in the light source, wherein at least a portion of the rear cover includes a heat receiving member having a higher heat receiving capability than the rest of the housing.

The present invention provides, in a second aspect thereof, a liquid crystal display (LCD) device including: a light source; an optical guide plate guiding, in an in-plane direction thereof, light emitted from the light source; a LCD panel disposed in front of the optical guide plate for receiving the light from the optical guide plate; and a housing for supporting at least the optical guide plate and the LCD panel in block, the housing including a rear cover and a rest of the housing; a heat sink opposing the rear cover and diffusing heat generated in the light source; and a heat diffusing member disposed on at least a portion of the rear cover, the heat diffusing member having a higher heat diffusing capability than the rest of the housing.

The present invention provides, in a third aspect thereof, a backlight unit including: a light source; an optical guide plate guiding, in an in-plane direction thereof, light emitted from the light source; a housing for supporting at least the optical guide plate, the housing including a rear cover and a rest of the housing; and a heat sink opposing the rear cover and diffusing heat generated in the light source, wherein at least a portion of the rear cover includes a heat receiving member having a higher heat receiving capability than the rest of the housing.

The present invention provides, in a fourth aspect thereof, a backlight unit including: light source; an optical guide plate guiding, in an in-plane direction thereof, light emitted from the light source; a housing for supporting at least the optical guide plate, the housing including a rear cover and a rest of the housing; a heat sink opposing the rear cover and diffusing heat generated in the light source; and a heat diffusing member disposed on at least a portion of the rear cover, the heat diffusing member having a higher heat diffusing capability than the rest of the housing.

The above and other objects, features and advantages of the present invention will be more apparent from the following description, referring to the accompanying drawings.

DETAILED DESCRIPTION OF THE PREFERRED EMBODIMENTS

Figure 1:
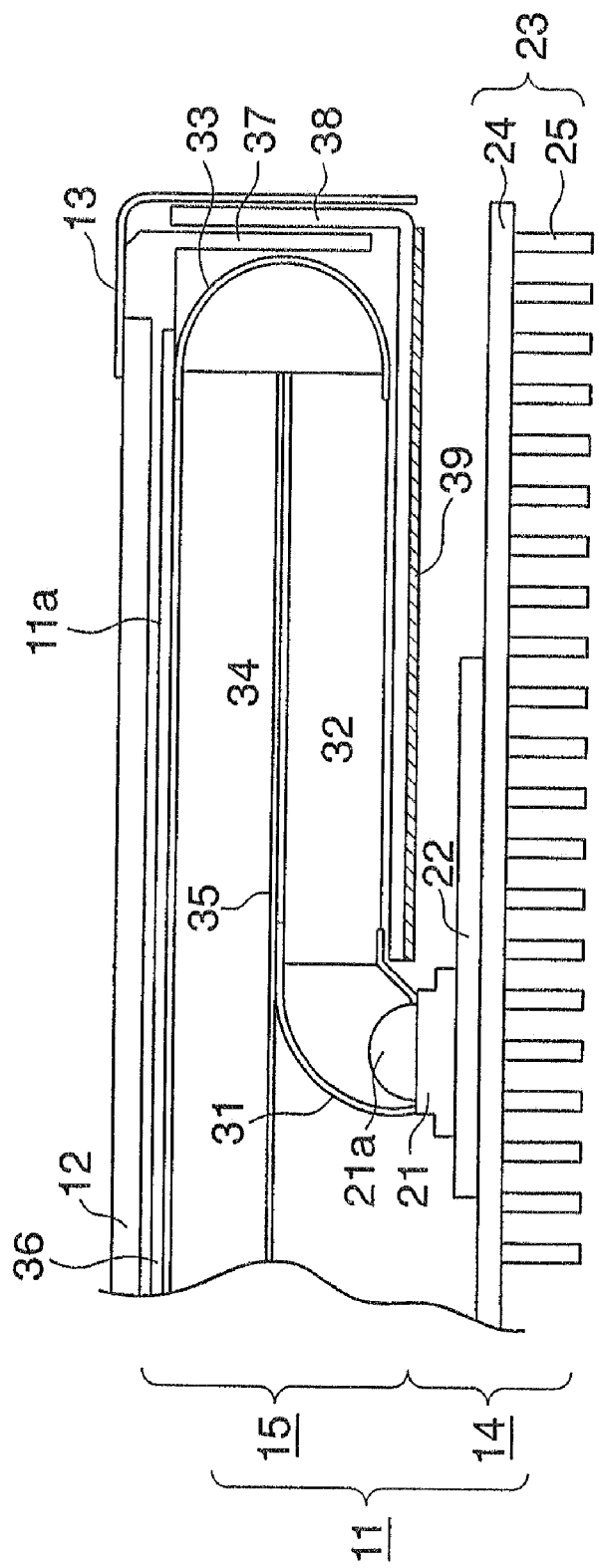
FIG. 1 is a sectional view showing the configuration of a LCD device according to a first embodiment of the present invention.

Now, exemplary embodiments of the present invention will be described with reference to accompanying drawings, wherein similar constituent elements are designated by similar reference numerals throughout the drawings.

Figure 4:
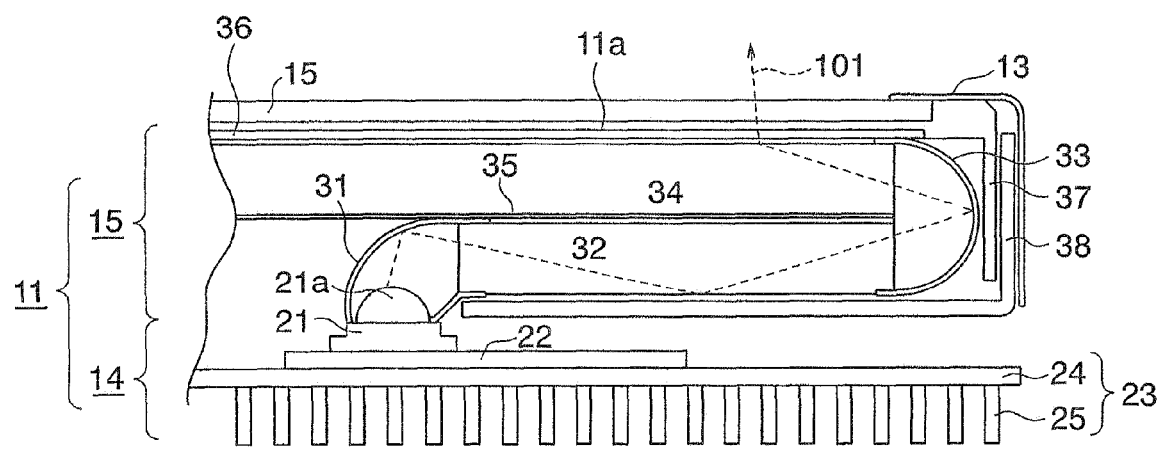
FIG. 4 is a sectional view showing the configuration of a conventional LCD device.

FIG. 1 is a sectional view of a LCD device according to a first embodiment of the present invention, taken along a horizontal plane. The LCD, generally designated by numeral 10, is configured similarly to the LCD device 100 of FIG. 4 except for the configuration of the rear surface of the rear cover 38. The LCD device 10 includes a backlight unit 11 provided with a light-emitting surface 11a on the front side thereof, a LCD panel 12 provided on the light-emitting surface 11a of the backlight unit 11, and a frame-like shield front 13 configuring a portion of a housing for defining the screen of the LCD panel 12.

The backlight unit 11 is an edge-light-source unit provided with a plurality of chip-type color LEDs 21 arranged in a direction perpendicular to the sheet of the drawing, i.e., from the top to the bottom of the LCD panel 12, and emitting color lights including red, green and blue lights. The backlight unit 11 includes a light-emitting section 14 including the color LEDs 21, and an optical guide section 15 for guiding the lights emitted from the LEDs to the light-emitting surface 11a. The light-emitting section 14 is further provided with a wiring board 22 mounting thereon the LEDs 21 for supplying electric power to the LEDs 21, and a heat sink 23 provided on the rear surface of the wiring board 22.

The optical guide section 15 includes a first reflector 31, a light-mixing optical guide plate 32, a second reflector 33 and a main optical guide plate 34. The first reflector 31 has a shape of 90-degrees elbow and includes a curved reflecting surface overhanging the LEDs 21 to reflects the color lights emitted from the LEDs 21 by 90 degrees. The light-mixing optical guide plate 32 guides the color lights reflected by the first reflector 31, and guides the color lights in the horizontal direction while mixing them to change the color lights into a white light. The second reflector 33 has a shape of half cylinder including a rear quarter-cylinder portion for receiving the white light from the light-mixing optical guide plate 32 and a front quarter-cylinder portion for receiving the white light reflected by the first quarter-cylinder portion to reflect the white light toward the main optical guide 34. The main optical guide plate 34 receives the white light reflected from the second reflector 33, and allows the white light to pass through the light-emitting surface 11a of the backlight unit 11. The inner wall of the first and second reflectors 31 and 33 and light-mixing optical guide plate 32 has a mirror surface. The second reflector 33 may be configured by a triangle prism made of a glass material.

A reflection sheet 35 is provided on the rear surface of the main optical guide plate 34. The reflection sheet 35 reflects a portion of the white light advancing within the main optical guide plate 34 and having a velocity component intersecting the reflection sheet 35 toward the light-emitting surface 11a of the backlight unit 11. On the front side of the main optical guide plate 34, there are provided a plurality of optical sheets 36 layered one on another. The optical sheets 36 diffuse or scatter the white light passing therethrough from the main optical guide plate 34, and improve the luminance and uniformity of the white light on the light-emitting surface 11a. A frame-like backlight chassis 37 is provided on the edge of the optical sheets 36 as a portion of the housing for defining the light-emitting surface 11a. A metallic rear cover 38 is provided as a portion of the housing on the rear surface of the light-mixing optical guide plate 32. The rear cover 38 is made of, for example, aluminum or aluminum alloy. On the rear surface of the rear cover 38, there is formed a stud (not shown) to which the heat sink 23 is fixed by means of screws.

In the present embodiment, on the surface of the rear cover 38 opposing the wiring board 22 and heat sink 23, there is provided a heat receiving section (heat receiving member) 39 having a higher heat receiving capability than the material configuring the rear cover 38. The higher heat receiving capability is imparted, for example, by a lower heat reflectivity realized by a dark surface, as well as a higher thermal conductivity and a larger thermal capacity of the material. The heat receiving section 39 is made of, for example, aluminum coated by an alumite treatment.

Figure 2:
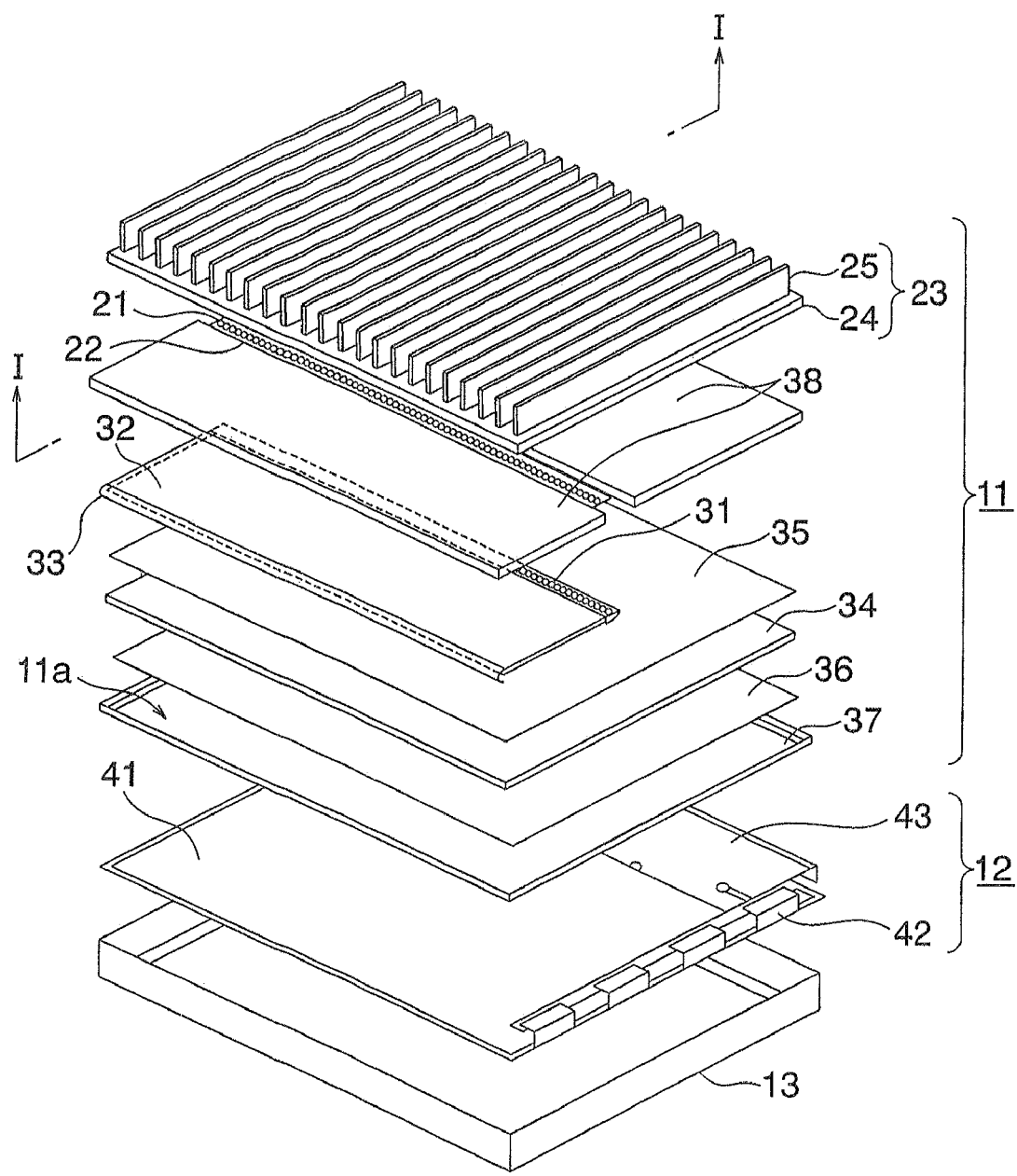
FIG. 2 is an exploded perspective view showing the LCD device of FIG. 1, as observed from the rear side thereof.

FIG. 2 is an exploded perspective view showing the LCD device of FIG. 1 as observed from the rear side thereof. The LCD panel 12 includes a panel body 41, a TCP (Tape Carrier Package) 42 coupled to the panel body 41, and a wiring board 43 coupled mechanically and electrically to the TCP 42. In the panel body 41, TFT's (Thin Film Transistors) are formed corresponding to the pixels arranged in a matrix. By driving the TFT's, the orientation of the liquid crystal (LC) molecules are controlled pixel by pixel, thereby providing an optical switching function. An IC (Integrated Circuit) chip is mounted in the TCP 42, and the wiring board 43 outputs control signals for controlling the driving by the TCP 42.

In operation of the LCD device 10, electric power is supplied to the LEDs 21, which operate for emitting lights and generate heat. In FIG. 1, the heat generated by the LEDs 21 is transferred to the base 24 of the heat sink 23 via the wiring board 22, and the heat sink 23 operates for heat-exchange with air via the fins 25. The heat transferred to the base 24 of the heat sink 23 is also transferred to the heat receiving section 39 by thermal radiation from the surface of the base 24 of the wiring board 22 or heat sink 23 opposing the rear cover 38 and by convection. Generally, the heat sink 23 is made of a material having a high heat dissipation capability, and the heat received therein is efficiently dissipated from the surface of the base 24 opposing the rear cover 38. The heat transferred to the heat receiving section 39 is dissipated to the rear cover 38, is further transferred to other sections such as the optical guide section 15, LCD panel 12 and shield front 13, and then is heat-exchanged with air on the front surface or the side surface of the LCD device 10.

According to the LCD device 10 of the present embodiment, the heat receiving section 39 provided on the rear surface of the rear cover 38 opposing the wiring board 22 and heat sink 23 and having a higher heat receiving capability than the material configuring the rear cover 38 and the rest of the housing allows the heat generated by the LEDs 21 to be dissipated from the heat sink 23 as well as from the front side or lateral side of the LCD device 10. Accordingly, the heat dissipation capability of the LCD device 10 can be improved without increasing the size of the device. Thereby, the change of color tones on the light-emitting surface 11a of the backlight unit due to the aged deterioration can be suppressed, and a higher color reproducibility can be maintained in the color LCD device for a long period of service. Also, as for the monochrome LCD device, the change of tone or luminance on the light-emitting surface due to the aged deterioration can be suppressed.

It is to be noted that the heat receiving section 39 may be formed, for example, by a ceramic treatment or titanium oxide treatment in addition to the alumite treatment as described above. In addition, there may be formed another heat radiation section having a higher heat receiving capability than the wiring board 22 or heat sink 23 on the surface of the wiring board 22 or heat sink 23 opposing the rear cover 38. In the above embodiment, the heat receiving section 39 is formed on the rear surface of the rear cover 38. However, for example, if a part of the shield front 13 opposes the heat sink 23, the heat receiving section 39 may be formed on the part of the shield front 13 opposing the heat sink 23.

The LCD devices 10 of the above embodiment and the conventional LCD devices 100 in which the heat receiving section 39 is not formed were manufactured as samples and comparative examples, respectively. The LCD devices of the embodiment and the comparative examples were operated under the same operating conditions. The temperature of the wiring board 22 in the vicinity of the LEDs 21 was measured, revealing that the temperature of the samples of the LCD device 10 was confirmed to be by 2 to 3° C. lower in comparison to that of the comparative examples of the conventional LCD device 100. Thus, it was confirmed that the LCD device 10 of the present embodiment can effectively improve the heat dissipation capability due to the provision of the heat receiving section 39.

In the above embodiment, the heat receiving section 39 is formed on the rear surface of the rear cover 38. However, a heat receiving sheet having higher heat receiving capability than the material configuring the rear cover 38 may be adhered onto the rear surface of the rear cover 38. As for the heat receiving sheet, for example, Mazuharuichiban ("Registered Trademark" made by Oki Electric Cable Co., Ltd.) can be used.

Figure 3:
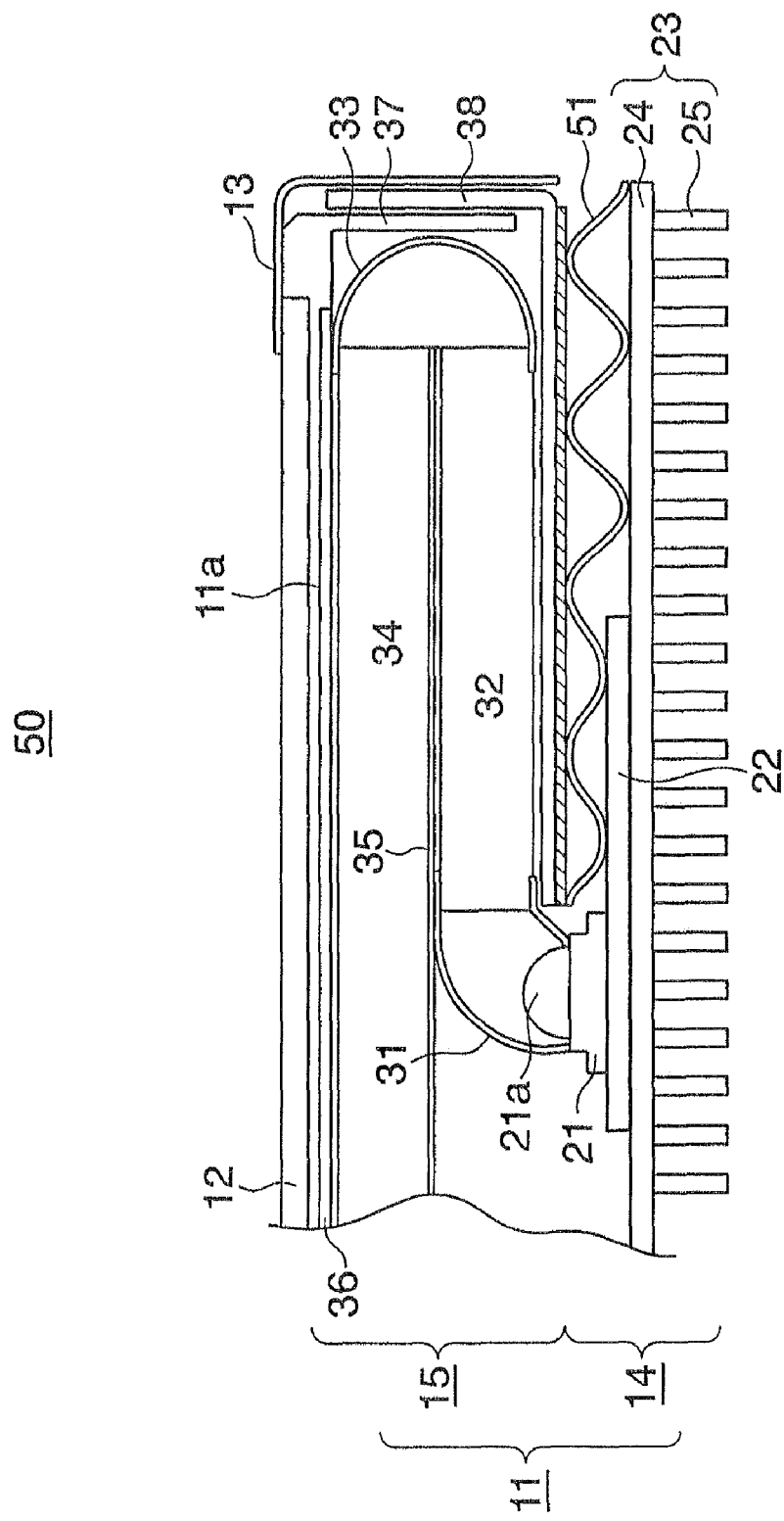
FIG. 3 is a sectional view showing the configuration of a LCD device according to a second embodiment of the present invention.

FIG. 3 is a sectional view showing the configuration of a LCD device according to a second embodiment of the present invention. In the LCD device generally designated by numeral 50, there is provided a corrugated heat radiation sheet (heat diffusing member) 51 between the heat sink 23 including the wiring board 22 and the rear cover 38, instead of the heat receiving section 39 formed on the rear surface of the rear cover 38. The heat radiation sheet 51 is flexible and slightly thicker than the distance between the heat sink 23 and the rear cover 38. The heat radiation sheet 51 may be made of a copper foil having a thermal conductivity of, for example, 385 W/m·K, and thus having a higher heat diffusing capability than the material of the housing.

During assembly of the LCD device 50, the heat radiation sheet 51 shrinks in the thickness direction thereof by the operation of sandwiching the heat radiation sheet 51 between the heat sink 23 including the wiring board 22 and the rear cover 38, pressing the wiring board 22 and heat sink 23 to the rear cover 38 with a suitable pressure. This pressing allows the heat exchange to be efficiently performed between the wiring board 22 and heat sink 23 and the heat radiation sheet 51 and between the heat radiation sheet 51 and the rear cover 38.

In the LCD device 50 of the present embodiment, the heat transferred to the wiring board 22 and heat sink 23 is dissipated to the rear cover 38 via the heat radiation sheet 51. Accordingly, as in the LCD device 10 of the first embodiment, the heat dissipation capability of the LEDs 21 can be improved without increasing the device size. It is to be noted that although there is no particular limitation in the thermal conductivity of the heat radiation sheet 51, a higher thermal conductivity of the heat radiation sheet 51 is preferred, and it is preferable that the thermal conductivity be higher than 90 W/m·K, which enables an efficient heat dissipation via the heat radiation sheet 51.

In the above embodiment, there is provided the corrugated heat radiation sheet 51 between the wiring board 22 and heat sink 23 and the rear cover 38. However, any member provided in contact with at least one of the wiring board 22 and heat sink 23 and the rear cover 38 may be used as the heat radiation sheet 51. A sponge or gasket may be provided. A sponge around which metallic fiber, for example, made of gold or copper, coils can be used.

As described above, in the embodiments of the present invention, the heat receiving member or heat receiving section having a higher heat receiving capability effectively receives the heat transferred to the heat sink or substrate mounting thereon the light source. This prevents the heat from diffusing toward the light emitting surface of the backlight and the LCD unit, whereby aged deterioration of the backlight unit or LCD unit can be suppressed.

While the invention has been particularly shown and described with reference to exemplary embodiments thereof, the invention is not limited to these embodiments. It will be understood by those of ordinary skill in the art that various changes in form and details be made therein without departing from the spirit and scope of the present invention as defined in the claims. The backlight unit is not limited to one for the LCD device and can be used as a lighting system for various applications.

What is claimed is:
1. A liquid crystal display (LCD) device comprising:
a light source;

an optical guide plate guiding, in an in-plane direction thereof, light emitted from said light source;

a LCD panel disposed in front of said optical guide plate for receiving said light from said optical guide plate;

a housing for supporting at least said optical guide plate and said LCD panel in block, said housing including a rear cover and a rest of said housing; and a heat sink opposing said rear cover and diffusing heat generated in said light source, wherein at least a portion of said rear cover includes a heat receiving member having a higher heat receiving capability than said rest of said housing, wherein said heat receiving member has a layered structure, and is laminated on a surface of said rear cover opposing said heat sink, and is spaced from said heat sink, and wherein said heat receiving member is configured to receive heat from said heat sink by thermal radiation and dissipate said heat to said rear cover.

2. The LCD device according to claim 1, wherein said housing includes aluminum and said heat receiving member is formed by an anodizing treatment of said aluminum.

3. The LCD device according to claim 1, wherein said heat receiving member is formed by a ceramic treatment or titanium oxide treatment of a material configuring said housing.

4. The LCD device according to claim 1, further comprising a heat diffusing sheet adhered onto at least a portion of said rear cover opposing said heat sink, said heat diffusing sheet having a higher heat diffusing capability than said rest of said housing.

5. The LCD device according to claim 4, wherein said heat diffusing sheet includes a corrugated sheet.

6. A backlight unit comprising:

a light source;

an optical guide plate guiding, in an in-plane direction thereof, light emitted from said light source;

a housing for supporting at least said optical guide plate, said housing including a rear cover and a rest of said housing; and a heat sink opposing said rear cover and diffusing heat generated in said light source, wherein at least a portion of said rear cover includes a heat receiving member having a higher heat receiving capability than said rest of said housing, wherein said heat receiving member has a layered structure, and is laminated on a surface of said rear cover opposing said heat sink, and is spaced from said heat sink, and wherein said heat receiving member is configured to receive heat from said heat sink by thermal radiation and dissipate said heat to said rear cover.

* * * * *